US006441728B1

(12) United States Patent
Dixit et al.

(10) Patent No.: US 6,441,728 B1
(45) Date of Patent: Aug. 27, 2002

(54) TIRE CONDITION SENSOR COMMUNICATION WITH TIRE LOCATION PROVIDED VIA VEHICLE-MOUNTED IDENTIFICATION UNITS

(75) Inventors: Rahul Dixit, Farmington Hills; Timothy DeZorzi, South Lyon, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/753,290

(22) Filed: Jan. 2, 2001

(51) Int. Cl.[7] ............................................. B60C 23/00
(52) U.S. Cl. ...................... 340/447; 340/442; 340/445
(58) Field of Search ........................ 340/442, 445, 340/447, 448, 10.3, 10.4, 10.1; 73/146.5; 200/61.22, 61.23; 267/64.11, 64.27, 64.28

(56) References Cited

U.S. PATENT DOCUMENTS

| | | | | |
|---|---|---|---|---|
| 4,319,220 A | * | 3/1982 | Pappas et al. ............... | 340/447 |
| 5,196,845 A | | 3/1993 | Myatt ........................... | 340/447 |
| 5,463,374 A | | 10/1995 | Mendez et al. .............. | 340/442 |
| 5,483,827 A | * | 1/1996 | Kulla et al. .................. | 73/146.5 |
| 5,513,525 A | * | 5/1996 | Schürmann .................. | 340/447 |
| 5,541,574 A | * | 7/1996 | Lowe et al. .................. | 340/447 |
| 5,573,610 A | | 11/1996 | Koch et al. ................... | 340/447 |
| 5,573,611 A | * | 11/1996 | Koch et al. ................... | 340/447 |
| 5,600,301 A | | 2/1997 | Robinson, III .............. | 340/442 |
| 5,602,524 A | | 2/1997 | Mock et al. .................. | 340/445 |
| 5,612,671 A | | 3/1997 | Mendez et al. .............. | 340/447 |
| 5,838,229 A | | 11/1998 | Robinson, III .............. | 340/442 |
| 5,880,363 A | | 3/1999 | Meyer et al. ................. | 340/445 |
| 5,883,305 A | * | 3/1999 | Jo et al. ........................ | 73/146.5 |
| 5,924,055 A | | 7/1999 | Hattori ......................... | 340/447 |
| 5,977,870 A | * | 11/1999 | Rensel et al. ................ | 340/442 |

FOREIGN PATENT DOCUMENTS

EP 1026015 A2 8/2000

OTHER PUBLICATIONS

An internet press release from Siemens Automotive dated Jan. 24, 2001.
U.S. Juzswik Patent application Ser. No. 09/687,709, filed Oct. 13, 2000 entitled Vehicle–Controlled Tire Condition Sensor Communication Utilizing Fixed Tire Identification.
U.S. Dixit et al.Patent application filed Jan. 2, 2001, Attorney Docket No. TRW(TE)5001, entitled Tire Condition Sensor Communication with Tire Location Provided via Manually Inputted Update.

* cited by examiner

Primary Examiner—Van Trieu
(74) Attorney, Agent, or Firm—Tarolli, Sundhiem, Covell, Tummino Szabo L.L.P.

(57) ABSTRACT

A tire condition communication system (10) for a vehicle (12) that has a tire (e.g., 14A). A sensor (e.g., 74), associated with the tire (e.g., 14A), senses at least one tire condition. A memory (e.g., 70), associated with the tire (e.g., 14A), holds an identification. Transmitter components (e.g., 80 and 22), associated with the tire (e.g., 14A) and operatively connected to the sensor (74) and the memory (70), transmit a condition signal (e.g., 24A) that indicates the held identification and the sensed tire condition. A vehicle-based unit (28) receives the transmitted condition signal (e.g., 24A) indicative of the held identification and the sensed tire condition. An identification provision unit (e.g., 42A), located on the vehicle (12) adjacent to the tire (e.g., 14A) and having a location identification, transmits the location identification in response to a request. A communication portion (e.g., 48A) of the tire condition sensor unit (e.g., 18A) communicates a request to the identification provision unit (e.g., 42A) to transmit the location identification. The tire condition sensor unit (e.g., 18A) receives the requested location identification and updates the held identification.

20 Claims, 5 Drawing Sheets

| LOCATION I.D. BIT(S) |
|---|

LOCATION IDENTIFICATION RESPONSE

| LOCATION I.D. BIT(S) | CONDITION(S) BITS (E.G., PRESSURE, TEMPERATURE) | CHECK SUM, ETC. |
|---|---|---|

TIRE CONDITION MESSAGE

TIRE CONDITION SENSOR COMMUNICATION WITH TIRE LOCATION PROVIDED VIA VEHICLE-MOUNTED IDENTIFICATION UNITS

TECHNICAL FIELD

The present invention relates to a tire condition monitoring system for providing a tire operation parameter, such as tire inflation pressure, to a vehicle operator. The present invention relates specifically to a tire condition monitoring system that provides ready identification of a tire providing condition information and avoids misidentification regardless of previous tire position change due to tire position rotation or the like.

BACKGROUND OF THE INVENTION

Numerous tire condition monitoring systems have been developed in order to provide tire operation information to a vehicle operator. One example type of a tire condition monitor system is a tire pressure monitor system that detects when air pressure within a tire drops below a predetermined threshold pressure value.

There is an increasing need for the use of tire pressure monitoring systems due to the increasing use of "run-flat" tires for vehicles such as automobiles. A run-flat tire enables a vehicle to travel an extended distance after significant loss of air pressure within that tire. However, a vehicle operator may have difficulty recognizing the significant loss of air pressure within the tire because the loss of air pressure may cause little change in vehicle handling and visual appearance of the tire.

Typically, a tire pressure monitoring system includes a pressure sensing device, such as a pressure switch, an internal power source, and a communications link that provides the tire pressure information from a location at each tire to a central receiver. The central receiver is typically connected to an indicator or display located on a vehicle instrument panel.

The communications link between each tire and the central receiver is often a wireless link. In particular, radio frequency signals are utilized to transmit information from each of the tires to the central receiver. However, in order for the central receiver to be able to properly associate received tire pressure information with the tire associated with the transmission, some form of identification of the origin of the signal must be utilized. Such a need for identification of the origin of the transmitted tire information signal becomes especially important subsequent to a tire position change, such a routine maintenance tire position rotation.

SUMMARY OF THE INVENTION

In accordance with one aspect, the present invention provides a tire condition communication system for a vehicle that has a tire. A sensed condition signal that includes an identification is transmitted to a vehicle-based unit. The system includes a tire condition sensor unit, associated with the tire, that sends the sensed condition signal. The system also includes an identification tag, located on the vehicle adjacent to the tire, that sends the identification to the tire condition sensor unit for inclusion in the signal to the vehicle-based unit.

In accordance with another aspect, the present invention provides a tire condition communication system for a vehicle that has a tire. Sensor means, associated with the tire, senses at least one tire condition. Memory means, associated with the tire, holds an identification. Transmitter means, associated with the tire and operatively connected to the sensor means and the memory means, transmits a signal that indicates the held identification and the sensed tire condition. Receiver means, associated with the vehicle, receives the transmitted signal indicative of the held identification and the sensed tire condition. Location identification means, located on the vehicle adjacent to the tire and having a location identification, transmits the location identification in response to a request. Update request means communicates a request to the location identification means to transmit the location identification. Identification update means, associated with the tire and operatively connected to the memory, receives the requested location identification and provides the received location identification to the memory means to be held as the held identification.

In accordance with yet another aspect, the present invention provides a method of providing tire condition communication for a vehicle that has a tire. A tire condition sensor unit is associating with the tire. An identification tag is affixed to the vehicle adjacent to the tire. An identification is sent from the identification tag to the tire condition sensor unit. A sensed condition signal that includes the identification is sent from the tire condition sensor unit to a vehicle-based unit.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
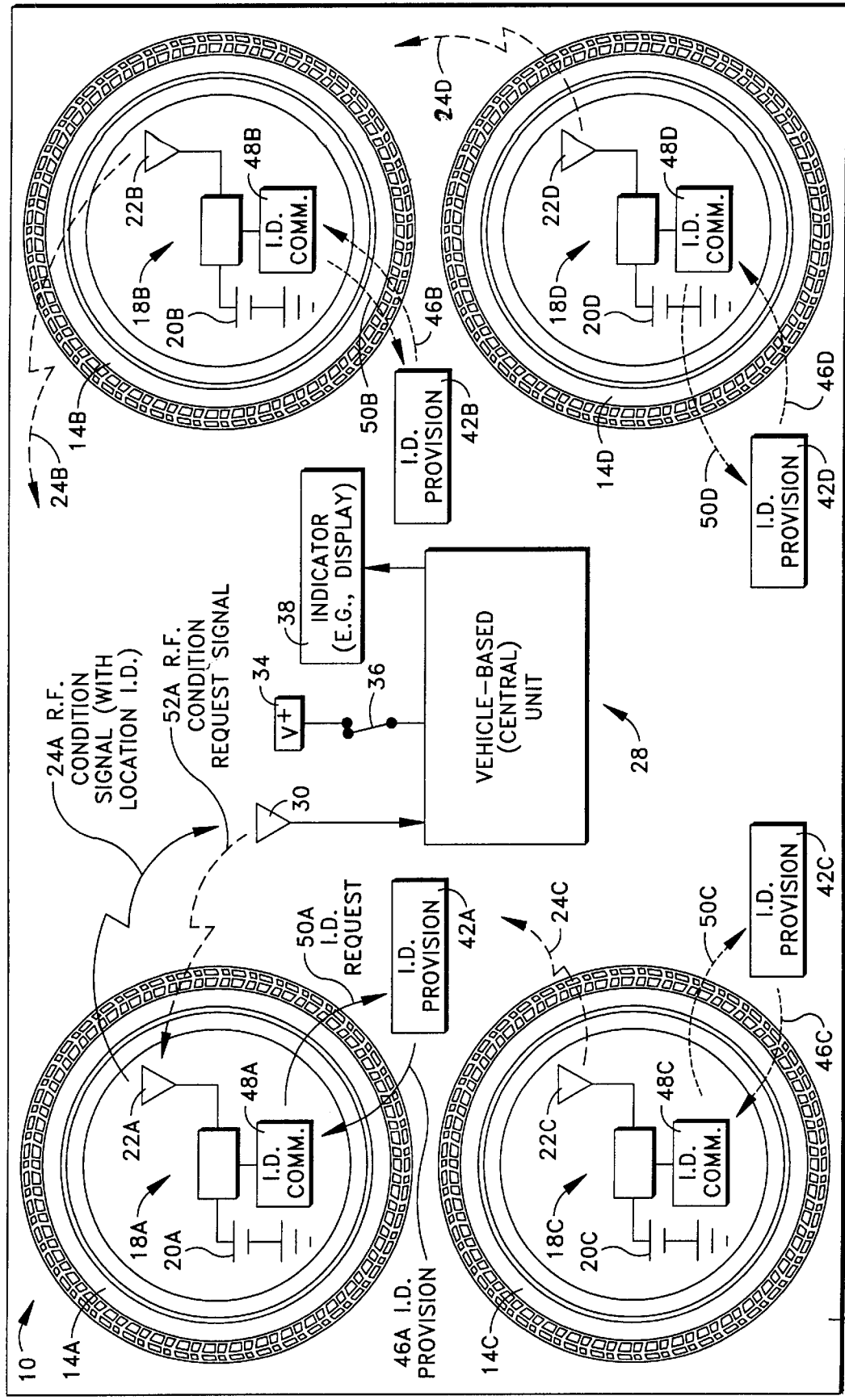
FIG. 1 is a schematic block diagram of a vehicle that contains a tire condition communication system in accordance with the present invention, and with a plurality of tire condition sensor units and a plurality of identification provision units.

A tire condition communication system 10 is schematically shown within an associated vehicle 12 in FIG. 1. The vehicle 12 has a plurality of inflatable tires (e.g., 14A). In the illustrated example, the vehicle 12 has four tires 14A–14D. It is to be appreciated that the vehicle 12 may have a different number of tires. For example, the vehicle 12 may include a fifth tire (not shown) that is stored as a spare tire.

The system 10 includes a plurality of tire condition sensor units (e.g., 18A) for sensing one or more tire conditions at the vehicle tires (e.g., 14A). Preferably, the number of tire condition sensor units 18A–18D is equal to the number of tires 14A–14D provided within the vehicle 12. In the illustrated example of FIG. 1, the tire condition sensor units 18A–18D have the same components. Identical components are identified with identical reference numerals, with different alphabetic suffixes. It is to be appreciated that, except as noted, the tire condition sensor units 18A–18D function in the same manner. For brevity, operation of one of the tire condition sensor units (e.g., 18A) is discussed in detail with the understanding that the discussion is generally applicable to the other tire condition sensor units (e.g., 18B–18D).

Each tire condition sensor unit (e.g., 18A) includes a power supply (e.g., a battery 20A) that provides electrical energy to various components within the respective sensor unit. The electrical energy enables the tire condition sensor unit (e.g., 18A) to energize a radio frequency antenna (e.g., 22A) to emit a radio frequency signal (e.g., 24A) that conveys one or more sensed conditions along with an identification to a central vehicle-based unit 28. Specifically, a radio frequency antenna 30 receives the signal (e.g., 24A) from the tire condition sensor unit (e.g., 18A) and the conveyed information is processed. In one example, the system 10 is designed to operate with the signals (e.g., 24A) in the FM portion of the radio frequency range. Hereinafter, the radio frequency signals (24A–24D) are referred to as condition signals.

A power supply (e.g., a vehicle battery) 34, which is operatively connected (e.g., through a vehicle ignition switch 36) to the vehicle-based unit 28, provides electrical energy to permit performance of the processing and the like. The vehicle-based unit 28 utilizes the processed information to provide information to a vehicle operator via an indicator device 38. In one example, the indicator device 38 may be a visual display that is located on an instrument panel of the vehicle 12. Accordingly, the vehicle operator is apprised of the sensed condition(s) at the tire (e.g., 14A).

It is to be noted that the sensed condition may be any condition at the tire (e.g., 14A). For example, the sensed condition may be inflation pressure of the tire (e.g., 14A), temperature of the tire, motion of the tire, or even a diagnostic condition of the tire condition sensor unit (e.g., 18A) itself.

It should be noted that only the single antenna 30 of the vehicle-based unit 28 receives all of the condition signals 24A–24D from a plurality of tire condition sensor units 18A–18D. In order for the vehicle-based unit 28 to accurately "know" which tire (e.g., 14A) is providing the condition signal (e.g., 24A), the identification conveyed via the condition signal is a location identification of the tire. Specifically, each of the condition signals 24A–24D conveys a location identification. The provision of location identifications via the condition signals 24A–24D from the tire condition sensor unit 18A–18D is accomplished by the system 10 including a plurality of identification provision units 42A–42D that provide location identifications to the tire condition sensor units.

Each identification provision unit (e.g., 42A) is associated with a respective tire mount location on the vehicle. Accordingly, each identification provision unit (e.g., 42A) is associated with a respective tire (e.g., 14A) and a respective tire condition sensor unit (e.g., 18A) associated with the respective tire.

Each identification provision unit (e.g., 42A) is fixedly mounted on the vehicle 12 at or adjacent to the area of attachment of the respective tire (e.g., 14A) to the vehicle. For example, the identification provision unit (e.g., 42A) is fixedly mounted (e.g., epoxy glued) within a wheel well 44 (FIG. 2) of the vehicle 12 that is provided for one of the ground-engaging tires (e.g., 14A).

Each identification provision unit (e.g., 42A) holds a location identification. In one embodiment, the identification is a fixed (i.e., non-changing) identification value. The identification is associated with the specific tire mounting location. Accordingly, when a tire (e.g., 14A) is located at the tire mounting location, that identification is considered to be associated with that tire.

Each identification provision unit (e.g., 42A, FIG. 1) communicates (e.g., signal 46A) with the associated tire condition sensor unit (e.g., 18A). Specifically, the identification provision unit (e.g., 42A) communicates (e.g., signal 46A) with a communication portion (e.g., 48A) of the associated tire condition sensor unit (e.g., 18A) to provide the location identification to the tire condition sensor unit. Thus, each identification provision unit (e.g., 42A) is an identification tag for that tire location.

Figures 2, 3, 4:
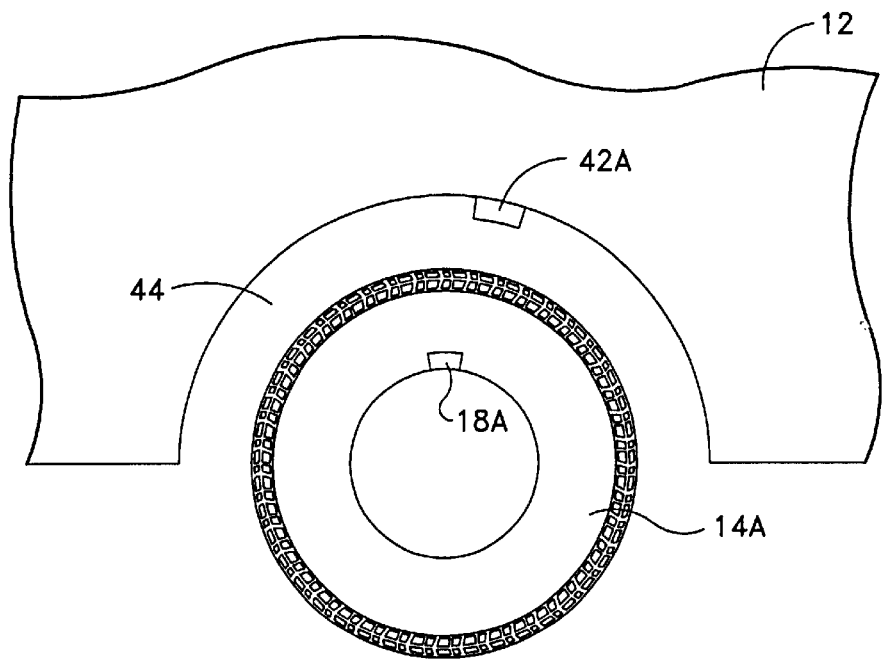
FIG. 2 is a schematic illustration of an example of relative locations for a tire condition sensor unit and an identification provision unit of the system of FIG. 1.
FIG. 3 is a representation of a signal message that coveys location identification from an identification provision unit within the system of FIG. 1.
FIG. 4 is a representation of a signal message packet that conveys location identification and sensed tire condition information from a tire condition sensor unit within the system of FIG. 1.

FIG. 3 illustrates an example of a message that is conveyed via the signal (e.g., 46A) to the tire condition sensor unit (e.g., 18A). Hereinafter, the signals 46A–46D are referred to as identification providing signals.

The tire condition sensor unit (e.g., 18A) utilizes the provided location identification as the identification transmitted within its condition signal (e.g., 24A) sent to the vehicle-based unit 28. FIG. 4 illustrates an example of a message package that is sent via the condition signal (e.g., 24A) to the vehicle-based unit 28. The location identification is sent along with condition information, and other message portions (e.g., error checking bits).

The vehicle-based unit 28 (FIG. 1) is programmed (e.g., taught) or has learned to recognize the location identifications for the various tire mount locations on the vehicle 12. Accordingly, when the vehicle-based unit 28 receives a signal that contains a certain location identification, the vehicle-based unit 28 interprets the signal as originating from a tire (e.g., 14A) located at that vehicle mount location.

It is contemplated that the provision of the location identification to the associated tire condition sensor unit (e.g., 18A) may be accomplished via different communication methods, formats, etc. In the illustrated example of FIG. 1, the provision of the location identification is accomplished via an interrogation exchange. When the tire condition sensor unit (e.g., 18A) wishes to receive a location identification, the communication portion (e.g., 48A) of the tire condition sensor unit outputs an interrogation signal (e.g., 50A) intended for reception by the associated identification provision unit (e.g., 42A). Hereinafter, the interrogation signals 50A–50D are referred to as identification request signals.

In response to receipt of the identification request signal (e.g., 50A), the identification provision unit (e.g., 42A) outputs the identification providing signal (e.g., 46A) that conveys the location identification. Upon receipt of the identification providing signal (e.g., 46A) from the identification provision unit (e.g., 42A), the associated tire condition sensor unit (e.g., 18A) utilizes the provided location identification for subsequent condition signals to the vehicle-based unit 28.

The occurrence of the interrogation to receive the location identification may occur upon initial power-up of the tire condition sensor unit (e.g., 18A), may occur based upon a predetermined time schedule, or may occur as a response to a radio frequency condition request signal (e.g., 52A shown via a dashed line in FIG. 1) from the vehicle-based unit 28 to one or more tire condition sensor units (e.g., 18A). It is to be understood that the present invention is not to be limited by the communication technique utilized to cause the provision of the location identification to the tire condition sensor unit (e.g., 18A) for use in the transmitted condition signal (e.g., 24A).

Figure 5:
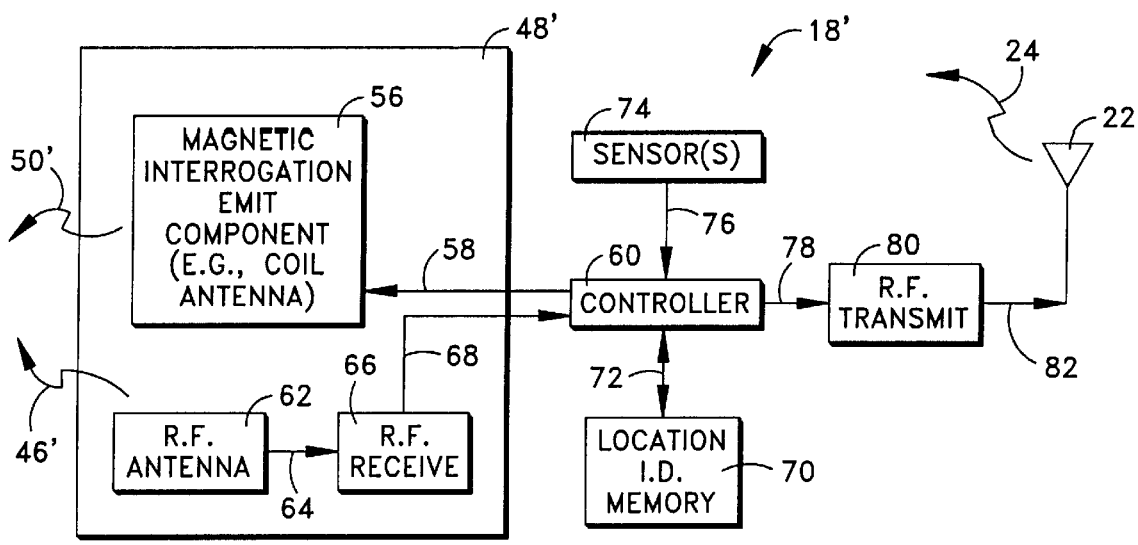
FIG. 5 is a function block diagram of a first embodiment of a tire condition sensor unit for the system of FIG. 1.
Figure 6:
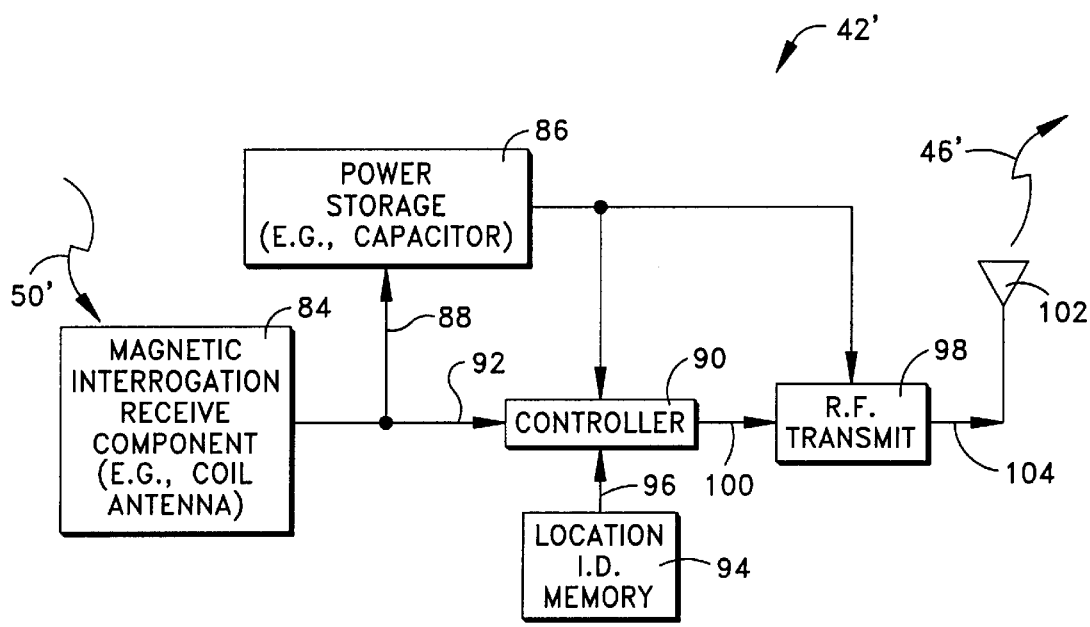
FIG. 6 is a function block diagram of a first embodiment of a vehicle-mounted identification provision unit for the system shown in FIG. 1.

FIGS. 5 and 6 illustrate first examples of a tire condition sensor unit 18' and an identification provision unit 42', respectively. Specifically, the first examples are provided for a communication scheme in which the identification request signal 50' output from the tire condition sensor unit 18' provides power to the identification provision unit 42', in addition to requesting the location identification. It is to be noted that the tire condition sensor unit 18' and the identification provision unit 42' are indicated using reference numerals with primes, to signify that the examples are for a first specific discussion. Also, it is to be noted that the tire condition sensor unit 18' and the identification provision unit 42' are indicated without use of alphabetic suffixes to signify that the examples are generic to all of the tire condition sensor units and all of the identification provision units, respectively.

Turning to the example of the tire condition sensor unit 18' shown in FIG. 5, a magnetic interrogation emitter component 56 of the communication portion 48' is operatively connected 58 to a controller 60. The magnetic interrogation emitter component 56 may include a coil antenna or the like. Upon excitation control provided by the controller 60, the magnetic interrogation emitter component 56 outputs the identification request signal 50' in the form of an electromagnetic field for reception by the associated identification provision unit 42' (FIG. 6).

A radio frequency antenna 62 (FIG. 5) of the communication portion 48' is operatively connected 64 to radio frequency receive circuitry 66. In the shown example, the identification providing signal 46' is in the form of a radio frequency for reception by the antenna 62. The RF receive circuitry 66 is, in turn, operatively connected 68 to the controller 60 such that the received location information is conveyed to the controller.

A location identification memory 70 is operatively connected 72 to the controller 60. When the controller 60 receives location information, the information is stored in the memory 70.

When the tire condition sensor unit 18' is to output a condition signal 24 that conveys tire condition information, the controller 60 receives sensory information from one or more sensors 74 that are operatively connected 76 to the controller 60. The controller 60 also then accesses the location information from the memory 70. A message package that contains the location information and the sensory information is assembled. See for example, the message package of FIG. 4.

The controller 60 (FIG. 5) is operatively connected 78 to RF transmit circuitry 80, which is in turn operatively connected 82 to the antenna 22. When the controller 60 provides the message package to the RF transmit circuitry 80, the RF transmit circuitry stimulates the antenna 22 to cause emission of the condition signal 24 that conveys both the location and tire condition information.

Turning to FIG. 6, the identification provision unit 42' includes a magnetic interrogation receive component 84. In one embodiment, the magnetic interrogation receive component 84 may include a coil antenna. When the identification request signal 50' (i.e., the magnetic field) is imposed upon the magnetic interrogation receive component 84, the magnetic interrogation receive component outputs electrical energy. For example, the output of the magnetic interrogation receive component may be an electrical pulse.

A power storage component 86 is operatively connected 88 to the magnetic interrogation receive component 84. In one example, the power storage component 86 includes a capacitor. The electrical energy output from the magnetic interrogation receive component 84 is stored by the power storage component 86 for use by other components within the identification provision unit 42'.

A controller 90 is operatively connected 92 to the magnetic interrogation receive component 84. The output electrical energy from the magnetic interrogation receive component 84 is a stimulus to the controller 90 that a location identification is requested. In response to the stimulus and via power provided by the power storage component 86, the controller 90 accesses the location identification from a location identification memory 94 that is operatively connected 96 to the controller. The controller 90 then provides an identification message to RF transmit circuitry 98 that is operatively connected 100 to the controller 90. The RF transmit circuitry 98, via power provided by the power storage component 86, provides a stimulus to a RF transmit antenna 102 that is operatively connected 104 to the RF transmit circuitry 98. In response to the stimulus, the antenna 102 outputs the identification providing signal 46' for reception by the associated tire condition sensor unit 18'. Thus, the identification provision unit 42' is an identification tag for the tire location.

Figure 7:
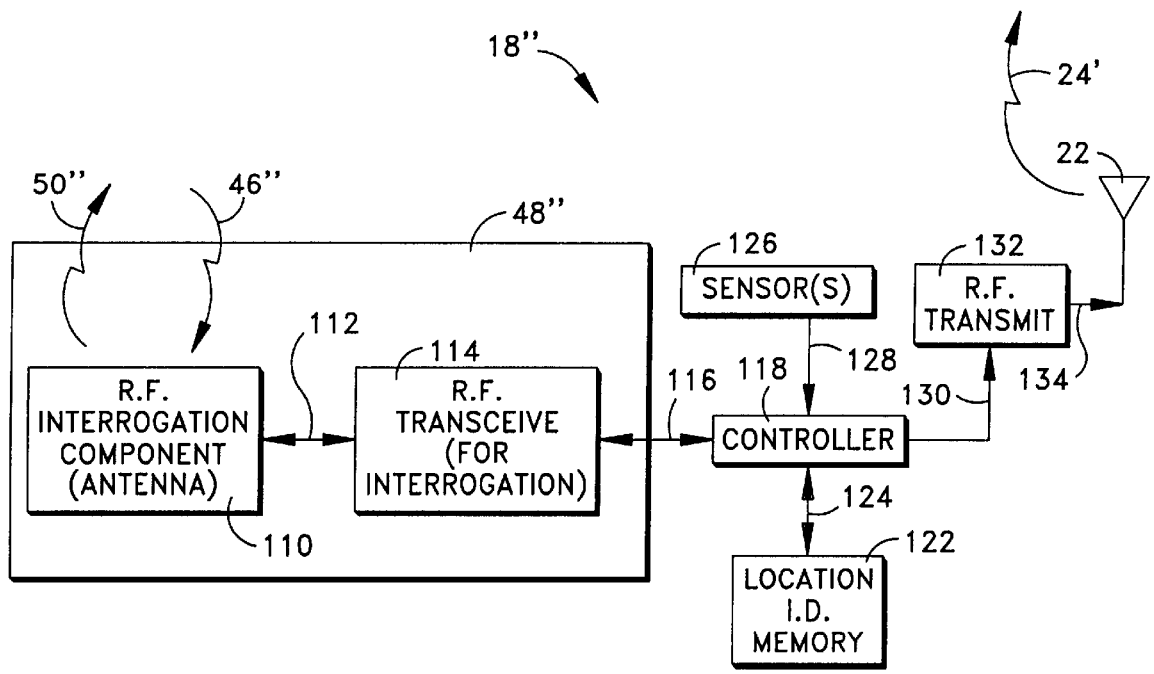
FIG. 7 is a function block diagram of a second embodiment of a tire condition sensor unit for the system of FIG. 1.
Figure 8:
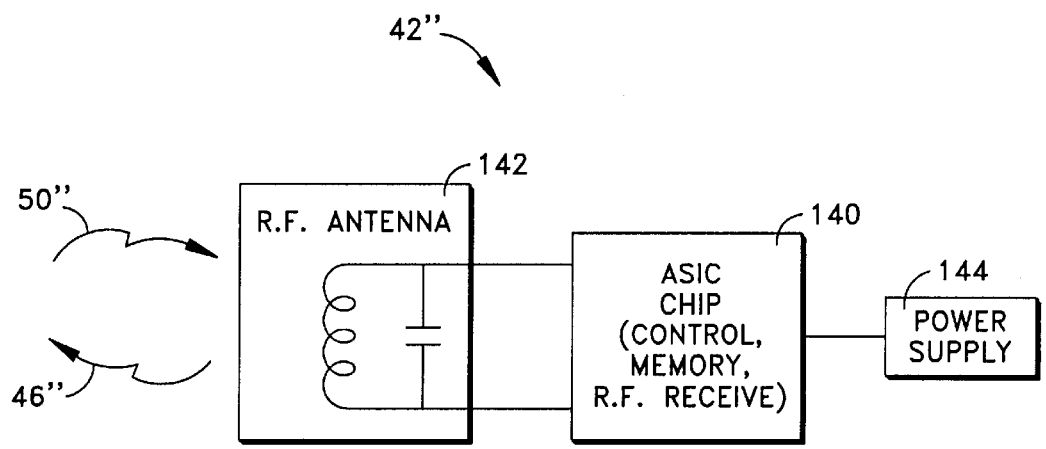
FIG. 8 is a function block diagram of a second embodiment of a vehicle-mounted identification provision unit for the system of FIG. 1.

FIGS. 7 and 8 illustrate second examples of a tire condition sensor unit 18" and an identification provision unit 42", respectively. Specifically, the first examples are provided for a communication scheme in which the identification request signal 50" provided by the tire condition sensor unit 18" does not provide power to the identification provision unit 42", but only requests the location identification. It is to be noted that the tire condition sensor unit 18" and the identification provision unit 42" are indicated using reference numerals with double primes, to signify that the examples are for a second specific discussion. Also, it is to be noted that the tire condition sensor unit 18" and the identification provision unit 42" are indicated without use of alphabetic suffixes to signify that the examples are generic to all of the tire condition sensor units and all of the identification provision units, respectively.

Turning to FIG. 7, the communication portion 48" of the tire condition sensor unit 18" includes a RF interrogation component 110 that is operatively connected 112 to RF transceive circuitry 114. In turn, the RF transceive circuitry 114 is operatively connected 116 to a controller 118. When it is desired to receive a location identification, the controller 118 provides a control signal to the RF transceive circuitry 114. In turn, the RF transceive circuitry stimulates the RF interrogation component 110, to output the identification request signal 50".

As a response to the identification request signal 50", the RF interrogation component 110 receives the identification providing signal 46" as a radio frequency signal. The RF interrogation component 110 provides an electrical signal to the RF transceive circuitry 114. In turn, the RF transceive circuitry 114 conveys the location identification information to the controller 118.

A location identification memory 122 is operatively connected 124 to the controller 118. Upon receipt of location information, the controller 118 stores the location information within the memory 122.

When the tire condition sensor unit 18" is to provide a condition signal 24 to the vehicle-based unit 28, the controller 118 receives sensory information from one or more sensors 126 that are operatively connected 128 to the controller. The controller 118 also accesses the location identification from the memory 122.

The controller 118 is further operatively connected 130 to RF transmit circuitry 132. A message package that contains the sensory information and the location identification is assembled by the controller 118 and provided to the RF transmit circuitry 132. In response to the provided message packet, the RF transmit circuitry 132 provides an electrical stimulus signal 134 to the antenna 22 that causes the antenna to output the condition signal 24 that conveys the sensory information and the location identification.

In the example of FIG. 7, the communication portion 48" is shown to be separate from the RF transmit circuitry 132 and the antenna 22. However, it is to be appreciated that the components may be combined in view the use of radio frequency signals for identification provision.

Turning to FIG. 8, the identification provision unit 42" includes an application specific-integrated circuit (ASIC) chip 140. The ASIC chip 140 includes control, memory. and RF transceive components. Attached to the ASIC chip 140 are a radio frequency antenna 142 and a power supply 144, such as a battery.

In response to receipt of an identification request signal 50" from the associated tire condition sensor unit 18", the antenna 142 provides an electrical signal to the ASIC chip 140. The ASIC chip 140 interprets, via power provided by the power supply 144, the signal as a request for provision of the location identification. The ASIC chip 140, using power from the power supply 144, stimulates the antenna 142 to cause output of the location identification providing signal 46". Thus, the identification provision unit 42" is an identification tag for the tire location.

Figure 9:
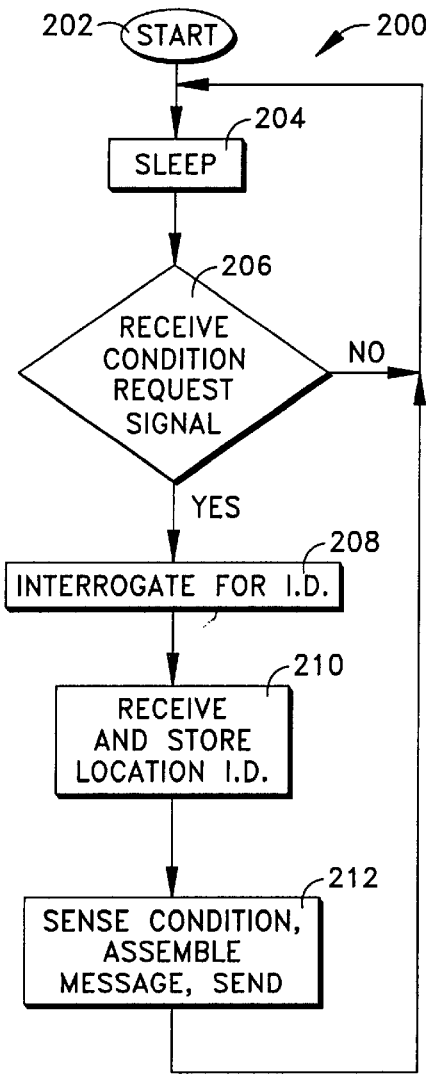
FIG. 9 is a flow chart for a first example process performed with a tire condition sensor unit of the system of FIG. 1.

A first example of a process 200 performed within a tire condition sensor unit (e.g., 18A, FIG. 1)) is shown in FIG. 9. The process 200 is associated with an embodiment of the system 10 in which the vehicle-based unit 28 controls which of the tire condition sensor units (e.g., 18A) is to provide tire condition information. Specifically, the process 200 is associated with the vehicle-based unit 28 providing a condition request signal (e.g., 52A) for reception by the respective tire condition sensor unit (e.g., 18A).

The process 200 is initiated at step 202 and proceeds to step 204. At step 204, the tire condition sensor unit (e.g., 18A) is in a sleep mode in order to conserve battery power. At step 206, it is determined whether a condition request signal (e.g., 52A) has been received. If the determination at step 206 is negative (i.e., a condition request signal is not received), the tire condition sensor unit (e.g., 18A) remains in the sleep mode (i.e., the process 200 proceeds from step 206 to step 204).

If the determination at step 206 is affirmative (i.e., the condition request signal 52A is received), the process 200 proceeds from step 206 to step 208. At step 208, the tire condition sensor unit (e.g., 18A) interrogates the associated identification provision unit (e.g., 42A). At step 210, the tire condition sensor unit (18A) receives and stores the location identification provided from the associated identification provision unit (e.g., 42A).

At step 212, tire condition status is derived (e.g., sensed), a message package is assembled, and the condition signal (e.g., 24A) that conveys the sensory information and the location identification is sent. Upon completion of step 212, the process 200 proceeds to step 204 (sleep mode).

It is to be noted that the process 200 provides for the reception (updating) of the location identification from the identification provision unit based upon each requested tire condition update. Accordingly, the process is suitable for use in the embodiments shown in FIGS. 5 and 6, wherein the tire condition sensor unit provides power to the identification provision unit.

Figure 10:
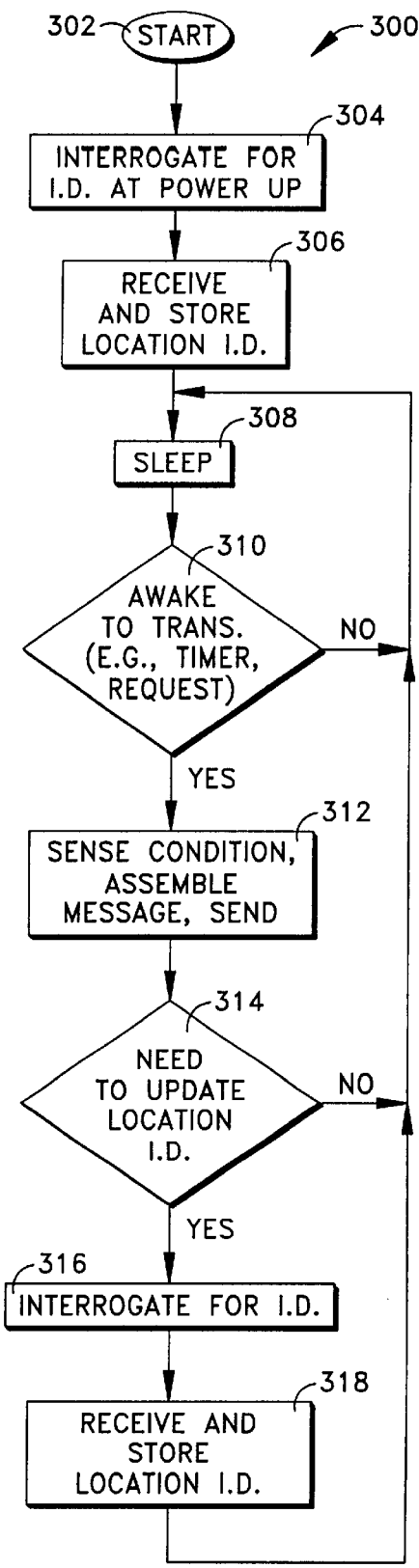
FIG. 10 is a flow chart for a second example process performed with a tire condition sensor unit of the system of FIG. 1.

Turning to FIG. 10, another example of a process 300 that is performed within a tire condition sensor unit (e.g., 18A) is shown. The process 300 is initiated at step 302 and proceeds to step 304. At step 304, the tire condition sensor unit (e.g., 18A) interrogates the associated identification provision unit (e.g., 42A). At step 306, the tire condition sensor unit (e.g., 18A) receives and stores the location identification provided by the associated identification provision unit (e.g., 42A).

At step 308, the tire condition sensor unit (e.g., 18A) is in a sleep mode in order to conserve battery power. At step 310, it is determined whether the tire condition sensor unit (e.g., 18A) is to awake for the transmission of a condition signal (e.g., 24A). The waking of the tire condition sensor unit (e.g., 18A) may be the result of expiration of a predetermined timer period or via the condition request signal (e.g., 52A) from the vehicle-based unit 28. If the determination at step 310 is negative (i.e., no stimulus to wake), the process 300 goes from step 310 to step 308 wherein the sensor unit remains asleep.

If the determination at step 310 is affirmative (i.e., the sensor unit awakes), the process 300 proceeds from step 310 to step 312. At step 312, tire condition sensory information is derived, the message package that includes the sensory information and the location identification is assembled, and the condition signal (e.g., 24A) is transmitted.

At step 314, it is determined whether the location identification value stored within the tire condition sensor unit (e.g., 18A) is to be updated. Updating may be in response to an external stimulus, expiration of a timer period, etc. Upon a negative determination at step 314 (i.e., no need to update the currently stored location identification), the process 300 proceeds from step 314 to step 308 (i.e., sleep).

Upon an affirmative determination at step 314 (i.e., a need to update the location identification), the process 300 proceeds from step 314 to step 316. At step 316, the tire condition sensor unit (e.g., 18A) interrogates the associated identification provision unit (e.g., 42A). At step 318, the tire condition sensor unit (e.g., 18A) receives and stores the location identification provided by the associated identification provision unit (e.g., 42A). Upon completion of step 318, the process 300 proceeds from step 318 to step 308 (i.e., sleep).

From the above description of the invention, those skilled in the art will perceive improvements, changes and modifications. For example, the illustrated embodiments show that the request to provide a location identification is via a signal (e.g., 50A) from a tire condition sensor unit (e.g., 18A). However, it is contemplated that the provision of a location identification may be via other stimulus (e.g., a signal from a hand-held unit), or the provision a location identification may be via some other, non-stimulus, arrangement (e.g., predefined, periodic provision of the location identification). Such improvements, changes and modifications within the skill of the art are intended to be covered by the appended claims.

Having described the invention, the following is claimed:

1. A tire condition communication system for a vehicle that has a tire, wherein a sensed condition signal that includes an identification is transmitted to a vehicle-based unit, said system comprising:
   a tire condition sensor unit, associated with the tire, that sends the sensed condition signal; and
   an identification tag, located on the vehicle adjacent to the tire, that sends the identification to said tire condition sensor unit for inclusion in the sensed condition signal which is sent from the tire condition sensor unit to the vehicle-based unit.

2. A system as set forth in claim 1, wherein said identification tag is affixed to the vehicle, within a wheel well of the vehicle provided for the tire.

3. A system as set forth in claim 1, wherein said tire condition sensor unit includes memory means for holding the identification.

4. A system as set forth in claim 1, wherein said tire condition sensor unit includes means for outputting a low frequency signal that is a request to said identification tag to send the identification, said identification tag includes means for outputting a low frequency signal that conveys the identification.

5. A system as set forth in claim 4, wherein said identification tag includes means for deriving electrical energy from the low frequency signal output from said tire condition sensor unit and for utilizing the electrical energy to power said means for outputting a low frequency signal that conveys the identification.

6. A system as set forth in claim 1, wherein said identification tag includes a power supply for providing electrical energy to power said identification tag.

7. A system as set forth in claim 1, wherein said tire condition sensor unit includes means for outputting the sensed condition signal as a radio frequency signal.

8. A system as set forth in claim 1, wherein said tire condition sensor unit includes means for sensing tire inflation pressure and means for sending the sensed condition signal to indicate the sensed inflation pressure.

9. An system as set forth in claim 1, wherein said tire condition sensor unit includes means for sensing tire temperature and means for sending the sensed condition signal to indicate the sensed temperature.

10. A tire condition communication system for a vehicle that has a tire, said system comprising:
    sensor means, associated with the tire, for sensing at least one tire condition;
    memory means, associated with the tire, for holding an identification;
    transmitter means, associated with the tire and operatively connected to said sensor means and said memory means, for transmitting a signal that indicates the held identification and the sensed tire condition;
    receiver means, associated with the vehicle, for receiving the transmitted signal indicative of the held identification and the sensed tire condition;
    location identification means, located on the vehicle adjacent to the tire and having a location identification, for transmitting the location identification in response to a request;
    update request means for communicating the request to said location identification means to transmit the location identification; and
    identification update means, associated with the tire and operatively connected to said memory means, for receiving the transmitted location identification and for providing the received transmitted location identification to said memory means to be held as the held identification.

11. A system as set forth in claim 10, wherein said update request means includes means for outputting a signal, said location identification means includes means for receiving the output signal and deriving energy from the received signal, and said location identification means includes means for utilizing the derived energy to transmit a signal that conveys the location identification.

12. A system as set forth in claim 10, wherein said update request means is associated with the tire.

13. A system as set forth in claim 10, wherein said location identification means is affixed to the vehicle, within a wheel well of the vehicle provided for the tire.

14. A system as set forth in claim 10, wherein said update request means includes means for outputting a low frequency signal that is the request to said location identification means to transmit the location identification, said location identification means includes means for outputting a low frequency signal that conveys the location identification.

15. A system as set forth in claim 14, wherein said location identification means includes means for deriving electrical energy from the low frequency signal output from said update request means and for utilizing the electrical energy to power said means for outputting the low frequency signal that conveys the location identification.

16. A system as set forth in claim 10, wherein said location identification means includes a power supply for providing electrical energy to power said location identification means.

17. A system as set forth in claim 10, wherein said transmitter means for transmitting the signal that indicates the held identification and the sensed tire condition includes means of r outputting the identification and condition indicative signal as a radio frequency signal.

18. A system as set forth in claim 10, including indicator means, associated with the vehicle, for providing an indication of the sensed tire condition to a vehicle operator.

19. A method of providing tire condition communication for a vehicle that has a tire, said method comprising:
    associating a tire condition sensor unit with the tire;
    affixing an identification tag to the vehicle adjacent to the tire;
    sending an identification from the identification tag to the tire condition sensor unit; and
    sending a sensed condition signal from the tire condition sensor unit to a vehicle-based unit, the tire condition sensor unit receiving the identification from the identification tag, the sensed condition signal including the received identification.

20. A method as set forth in claim 19, including sending a request from the tire condition sensor unit to the identification tag to send the identification.

* * * * *